US011665215B1

(12) United States Patent
Zavesky et al.

(10) Patent No.: US 11,665,215 B1
(45) Date of Patent: May 30, 2023

(54) CONTENT DELIVERY SYSTEM

(71) Applicants: AT&T Intellectual Property I, L.P., Atlanta, GA (US); AT&T Mobility II LLC, Atlanta, GA (US)

(72) Inventors: Eric Zavesky, Austin, TX (US); Jing Guo, Olney, MD (US); Eric Petajan, Watchung, NJ (US); Jessica Owensby, Alpharetta, GA (US); James Pratt, Round Rock, TX (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 17/662,147

(22) Filed: May 5, 2022

(51) Int. Cl.
*H04L 65/61* (2022.01)
*H04L 65/75* (2022.01)
*H04L 65/80* (2022.01)

(52) U.S. Cl.
CPC ............ *H04L 65/61* (2022.05); *H04L 65/762* (2022.05); *H04L 65/80* (2013.01)

(58) Field of Classification Search
CPC ........ H04L 65/61; H04L 65/762; H04L 65/80
See application file for complete search history.

(56) References Cited

U.S. PATENT DOCUMENTS

| 10,237,324 | B1 * | 3/2019 | DeLuca | H04L 65/403 |
|---|---|---|---|---|
| 10,432,686 | B1 * | 10/2019 | Wu | H04L 43/0882 |
| 10,432,690 | B1 * | 10/2019 | Li | H04L 65/612 |
| 11,290,465 | B1 * | 3/2022 | Lyons | H04L 63/12 |
| 11,405,448 | B1 * | 8/2022 | Seigneurbieux | H04L 65/403 |
| 11,431,781 | B1 * | 8/2022 | Carofiglio | H04L 65/765 |
| 2004/0045030 | A1 * | 3/2004 | Reynolds | H04N 19/12 725/110 |
| 2007/0299710 | A1 * | 12/2007 | Haveliwala | G06Q 10/10 705/7.19 |
| 2007/0300165 | A1 * | 12/2007 | Haveliwala | G06F 3/0482 715/810 |
| 2011/0019644 | A1 * | 1/2011 | Cheon | H04W 36/0033 455/436 |
| 2011/0173332 | A1 * | 7/2011 | Li | H04L 12/14 709/227 |

(Continued)

OTHER PUBLICATIONS

Michael Seufert, et al, A Survey on Quality of Experience of HTTP Adaptive Streaming, 2015 (Year: 2015).*

(Continued)

*Primary Examiner* — Javier O Guzman
(74) *Attorney, Agent, or Firm* — Amin, Turocy & Watson, LLP

(57) ABSTRACT

Personalized content delivery (e.g., using a computerized tool) is enabled. For example, a system can comprise: a processor and a memory that stores executable instructions that, when executed by the processor, facilitate performance of operations, comprising: determining a quality of service metric representative of a quality of service of streamed content delivered via a content delivery network, determining a quality of experience metric representative of a quality of experience associated with a user profile of a consumer of the streamed content, and based on the quality of service and the quality of experience, modifying the streamed content.

20 Claims, 10 Drawing Sheets

(56) References Cited

U.S. PATENT DOCUMENTS

| | | | | |
|---|---|---|---|---|
| 2011/0235595 | A1* | 9/2011 | Mehta | H04W 8/082 370/329 |
| 2013/0067109 | A1* | 3/2013 | Dong | H04N 21/64723 709/231 |
| 2013/0159498 | A1* | 6/2013 | Funge | H04N 21/44218 709/224 |
| 2013/0195204 | A1* | 8/2013 | Reznik | H04L 65/756 375/240.26 |
| 2015/0334153 | A1* | 11/2015 | Koster | H04L 67/60 709/219 |
| 2017/0262774 | A1* | 9/2017 | O'Sullivan | G06Q 10/02 |
| 2017/0289622 | A1* | 10/2017 | Roch | H04N 21/4621 |
| 2018/0103072 | A1* | 4/2018 | Liu | H04L 65/756 |
| 2019/0098067 | A1* | 3/2019 | Sandoval | H02J 13/00024 |
| 2020/0029086 | A1* | 1/2020 | Zou | H04N 19/436 |
| 2020/0312005 | A1* | 10/2020 | Desai | G06F 3/1438 |
| 2020/0351533 | A1* | 11/2020 | Bampis | H04N 21/251 |
| 2021/0319408 | A1* | 10/2021 | Jorasch | G06Q 10/1095 |

OTHER PUBLICATIONS

Apple Support | "Use an iPad as a second display for a Mac". Webpage https://support.apple.com/en-us/HT210380, last accessed Mar. 25, 2021, 6 pages.

TECHCRUNCH | "Microsoft acquires TakeLessons, an online and in-person tutoring platform, to ramp up its edtech play", webpage https://techcrunch.eom/2021/09/10/microsoft-acquires-takelessons-an-online-and-in-person-tutoring-platform-to-ramp-up-its-edtech-play/, published Sep. 10, 2021, last accessed Mar. 24, 2022, 4 pages.

TECHCRUNCH | "LinkedIn doubles down on development with new learning hub, free courses and new search fields for hybrid working", webpage https://techcrunch.com/2021/09/09/linkedin-doubles-down-on-development-with-new-learning-hub-free-courses-and-new-search-fields-for-hybrid-working/, published Sep. 9, 2021, last accessed Mar. 25, 2022, 2 pages.

PANOPTO | Website https://www.panopto.com/, last accessed Apr. 27, 2022, 11 pages.

* cited by examiner

CONTENT DELIVERY SYSTEM

TECHNICAL FIELD

The disclosed subject matter relates to videotelephony and, more particularly, to personalized content delivery.

BACKGROUND

Remote content delivery is becoming increasingly prevalent with the proliferation of online learning (e.g., distance learning) and virtual classrooms. Virtual classrooms permit live or pre-recorded teaching to continue, for instance, when in-person learning is not possible or is not practical. However, when compared to in-person learning, there exist drawbacks with existing remote content delivery systems. For example, quality of content streams can vary by learner and their corresponding hardware or internet connection quality, learners can become distracted at their remote locations, there exists less interaction and collaboration between learners, and learners can more easily fall behind. Additionally, it can be difficult for a remote instructor to recognize these problems if a live remote instructor even exists at all.

The above-described background relating to videotelephony is merely intended to provide a contextual overview of some current issues and is not intended to be exhaustive. Other contextual information may become further apparent upon review of the following detailed description.

DETAILED DESCRIPTION

Figure 1:
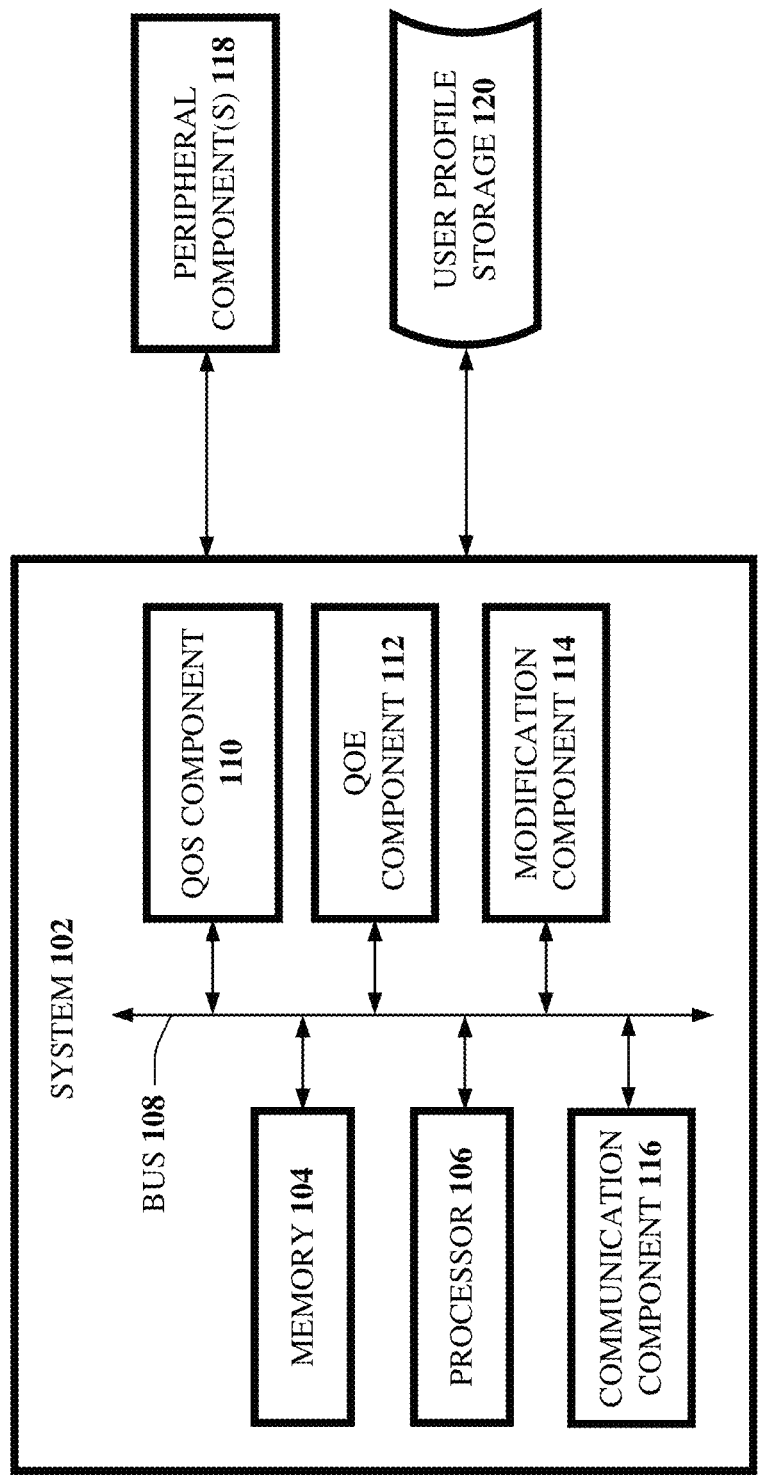
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, personalized content delivery (e.g., for remote learning) can be improved in various ways, and various embodiments are described herein to this end and/or other ends.

According to an embodiment, a system can comprise a processor, and a memory that stores executable instructions that, when executed by the processor, facilitate performance of operations, comprising: determining a quality of service (QoS) metric representative of a quality of service of streamed content delivered via a content delivery network (CDN), determining a quality of experience (QoE) metric representative of a quality of experience associated with a user profile of a consumer of the streamed content, and based on the quality of service and the quality of experience, modifying the streamed content.

In one or more embodiments, the quality of service metric can comprise a throughput of the content delivery network or a bandwidth of the content delivery network. In further embodiments, the quality of service metric can comprise a latency of the content delivery network. In additional embodiments, the quality of service metric can comprise packet loss associated with the streamed content (e.g., over the content delivery network). In other embodiments, the quality of service metric or quality of experience metric can be based on a biometric indicator of the consumer of the streamed content. In this regard, the biometric indicator can comprise an eye squint of the consumer determined via a camera of the system. Additionally, or alternatively, the biometric indicator can comprise a sound of the consumer captured via a microphone of the system. Additionally, or alternatively, the biometric indicator can comprise a vital health metric determined via a wearable device, of the system, worn by the consumer of the streamed content.

In various embodiments, modifying the streamed content can comprise: based on the quality of service or the quality of experience, generating a breakout room, and moving a group of user profiles, comprising the user profile, to the breakout room, wherein the group of user profiles are determined to comprise threshold similar quality of service of quality of experience.

In another embodiment, a non-transitory machine-readable medium can comprise executable instructions that, when executed by a processor, facilitate performance of operations, comprising: determining a quality of service metric representative of a quality of service of streamed content delivered via a content delivery network, determining a quality of experience metric representative of a quality of experience associated with a user profile of a consumer of the streamed content, and based on the quality of service and the quality of experience, modifying the streamed content.

In various embodiments, modifying the streamed content can comprise: in response to a determination that the quality of service fails to satisfy a defined quality of service threshold, or that the quality of experience fails to satisfy a defined quality of experience threshold, replaying a portion of the streamed content determined to be associated with the failure to satisfy the defined quality of service threshold or the failure to satisfy the defined quality of experience threshold.

In one or more embodiments, modifying the streamed content can comprise modifying delivery of the streamed content. In this regard, modifying the delivery of the streamed content can comprise changing from a first delivery scheme to a second delivery scheme, different from the first delivery scheme. Further in this regard, the first delivery scheme can comprise an extended reality transmission of the streamed content. In additional embodiments, the streamed content can comprise first streamed content displayed via first display equipment, and modifying the delivery of the streamed content can comprise displaying second streamed content, associated with the first streamed content, via second display equipment. For example, when a user is viewing streaming video (e.g., streamed content) while using video/audio conferencing, the QoE can be balanced between the two services (e.g., to avoid congesting a local area network (LAN) and/or a CDN herein). In an implementation, the QoE of the streaming video can be more important than the QoE of the video conferencing, which may downgrade to only audio conferencing if only very limited network throughput is available.

In one or more embodiments, the quality of service can be determined based on a hardware characteristic of user equipment associated with the user profile. In additional embodiments, the user profile can be generated using a user profile model. In this regard, the user profile model can be (or has been) generated using machine learning applied to past streamed content other than the streamed content. In a nonlimiting example, a speakerphone audio impairment can be detected by a system herein. In this regard, the system can generate a prompt to switch from the speakerphone to a headset.

According to yet another embodiment, a method can comprise: determining, by a system comprising a processor, a quality of service metric representative of a quality of service of streamed content delivered via a content delivery network, determining, by the system, a quality of experience metric representative of a quality of experience associated with a user profile of a consumer of the streamed content, and based on the quality of service and the quality of experience, modifying, by the system, the streamed content.

In various embodiments, the quality of service can be determined, by the system, using a quality of service model, and the quality of service model can be (or has been) generated, by the system, using machine learning applied to past qualities of service of past streamed content other than the streamed content.

In one or more embodiments, the quality of experience is determined, by the system, using a quality of experience model, and the quality of experience model can be (or has been) generated, by the system, using machine learning applied to past qualities of experience of past streamed content other than the streamed content.

In various implementations, the above method can further comprise: based on the quality of service and the quality of experience, generating, by the system, a test to be presented via a user interface of the system. In this regard, modifying the streamed content can be further based on a result of the test.

In further implementations, the above method can further comprise: receiving, by the system via the content delivery network, a request to modify the streamed content. In this regard, the streamed content can be modified, by the system, based on the request.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool, which can be configured to perform various operations relating to personalized content delivery (e.g., for remote learning). The system 102 can comprise one or more of a variety of components, such as memory 104, processor 106, bus 108, QoS component 110, QoE component 112, modification component 114, and/or communication component 116. In various embodiments, the system 102 can be communicatively coupled to, or can further comprise, peripheral component(s) 118 and/or user profile storage 120. In various embodiments, one or more of the memory 104, processor 106, bus 108, QoS component 110, QoE component 112, modification component 114, communication component 116, peripheral component(s) 118 and/or user profile storage 120 can be communicatively or operably coupled (e.g., over a bus or wireless network) to one another to perform one or more functions of the system 102.

According to an embodiment, the QoS component 110 can determine a quality of service metric representative of a quality of service of streamed content delivered via a CDN (e.g., CDN 504). In various embodiments, the quality of service metric can comprise, or can be based on, one or more of a throughput of the content delivery network, bandwidth of the content delivery network, a latency of the content delivery network, packet loss associated with the streamed content (e.g., over the content delivery network). In this regard, the QoS metric (e.g., a defined QoS metric) can be utilized to quantify QoS for streamed content delivered via a CDN. In various embodiments, one or more QoS metrics can be aggregated and/or weighted in order to determine a QoS score (e.g., using a defined algorithm or using machine learning as later discussed in greater detail). Such a QoS score can be utilized to quantify (e.g., by the QoS component 110) QoS for streamed content for one or more users of a content delivery network (e.g., CDN 504).

In one or more embodiments, the content delivery network can stream content (e.g., content associated with a virtual classroom) between a system herein and one or more peripheral component(s) 118. Additionally, or alternatively, content can be streamed between peripheral components 118. Such peripheral components can comprise, for instance, desktop computers, laptop computers, tablets, smartphones, smartwatches, television, projector, cameras, microphones, wearable devices, extended reality equipment, virtual reality equipment, augmented reality equipment, head-mounted displays, biometric devices, input or output devices, or other suitable peripheral components. It is noted that such peripheral components can comprise user equipment or user devices. It is additionally noted that QoS can vary per user (and corresponding peripheral components). In this regard, QoS can be determined for each respective user associated with a CDN (e.g., CDN 504). For example, learners (e.g., users) in a virtual classroom (e.g., associated with the CDN 504) or in a virtual meeting associated with the CDN 504 can comprise varying respective connection speeds or can utilize different technology platforms or equipment. In this regard, QoS metrics to thus be utilized to customize or enhance (e.g., modified by the modification component 114) the learning experience for the learner or user (e.g., modifying a bit rate of streamed content, zooming on a portion of the streamed content, cropping a video of the streamed content, reducing complexity of an avatar of the streamed content, reducing the streamed content to audio only or video only, modifying a playback speed of the streamed content, or other suitable modifications). Similarly, teachers, instructors, or other suitable users can comprise varying QoS, and content delivery can additionally, or alternatively be modified for teachers, instructors, or other suitable users.

It is noted that in various embodiments, QoS can be determined (e.g., by the QoS component 110) based on a hardware characteristic of user equipment (e.g., peripheral component 118) associated with a user profile (e.g., determined, by the system 102, or a component of the system 102, to be associated with a user profile stored in the user profile storage 120. In this regard, one or more users profiles herein can be stored in the user profile storage 120. In various embodiments herein, QoS (e.g., over the CDN 504) via a desktop computer, can differ from QoS over the CDN 504 via a smartphone, which can differ from QoS over the CDN 504 via augmented reality goggles, and so on. Therefore, personalized experiences (e.g., of the streamed content) (e.g., as implemented via the modification component 114) can be based on throughput or available bandwidth between a respective user equipment (e.g., peripheral component 118) and another entity, such as a system herein or another user equipment or peripheral equipment. In this regard, a bit rate of streamed content herein, or an aspect of streamed content herein such as an avatar, graphics, audio, etc., can be varied, for instance, so a user experience can correspond to available bandwidth or allotted throughput or bandwidth (e.g., by a system herein).

According to an embodiment, the QoE component 112 can determine a quality of experience metric representative of a quality of experience associated with a user profile of a consumer of the streamed content. In various embodiments, the QoE can be representative of a user's (e.g., user profile's) experience with the streamed content. For example, a low QoE metric representative of a low QoE (e.g., according to a defined QoE scale, lookup table, or determined via machine learning as later discussed in greater detail) can be representative of a user struggling to understand streamed content and its corresponding subject matter. A high QoE metric representative of a high QoE (e.g., according to a defined QoE scale, lookup table, or determined via machine learning as later discussed in greater detail) can be representative, for instance, of a user mastering understanding of the streamed content. In an embodiment, the QoE component 112 can interpret cues (e.g., captured via peripheral component(s) 118) of a user indicative of whether the user is absorbing (e.g., understanding) the information, for instance, by tracking facial expressions or providing an interface (e.g., via the communication component 116) that derives feedback for instructor or teacher of the streamed content. In this regard, feedback (e.g., user feedback herein) can comprise one or more of a variety of forms (e.g., direct facial recognition, facial expression recognition, via user interface to allow manual feedback entry, or another suitable form to convey feedback).

In one or more embodiments, a QoE metric can be modified or augmented (e.g., via the QoE component 112) by one or more observations of the user and/or consumption of the streamed content (e.g., simple replay of the same section of content, pausing, skipping, slowing down or speeding up, or bookmarking the streamed content). In another embodiment, the QoE metric can be augmented (e.g., via the QoE component 112) by external performance signals, such as objective examination grades, use of raw material (e.g., in a design or crafts creation setting). In yet another embodiment, the QoE metric can be augmented (e.g., via the QoE component 112) by engagement signals from external sources, such as co-occurrent communication (e.g., email, text messages, social media postings), co-occurrent content consumption (e.g., additional web- or streamed content simultaneously viewed), or focus on the primary delivery device (e.g., as detected via the QoE component 112 from "background windows" or "screen off" activities).

According to an embodiment, the modification component 114 can, based on the quality of service and the quality of experience, modify the streamed content. It is noted that in one or more embodiments, modifying the streaming content (e.g., via the modification component 114) can occur in response to receiving (e.g., by the communication component 116 via a content delivery network) (e.g., from a user equipment, such as a peripheral component 118), a request to modify the streamed content. In this regard, streamed content can be modified (e.g., via the modification component 114) based on the request.

It is noted that the communication component 116 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

In various embodiments, modifying the streamed content (e.g., via the modification component 114) can comprise, in response to a determination (e.g., via the QoS component 110) that the quality of service fails to satisfy a defined quality of service threshold, or in response to a determination (e.g., via the QoE component 112) the quality of experience fails to satisfy a defined quality of experience threshold, replaying a portion of the streamed content determined (e.g., by the QoS component 110 and/or QoE component 112) to be associated with the failure to satisfy the defined quality of service threshold or the failure to satisfy the defined quality of experience threshold. In further embodiments, modifying (e.g., by the modification component 114) the streamed content can comprise zooming on a portion of the streamed content, cropping a video of the streamed content, reducing complexity of an avatar of the streamed content, reducing the streamed content to audio only or video only, modifying a playback speed of the streamed content, or other suitable modifications. For example, throughput or bandwidth between a user equipment (e.g., peripheral component 118) and a system herein can be determined to fall below a defined throughput threshold or a defined bandwidth threshold (e.g., by the QoS component 110), which can be determined (e.g., by the QoS component 110) to be indicative of a peripheral component 118 not receiving streamed content as intended. Therefore, the QoS can be determined (e.g., via the QoS component 110) not to satisfy the QoS threshold, and a portion of the streamed content associated with the failure can be replayed (e.g., by the modification component 114 and/or communication component 116). In another example, a user can be determined (e.g., by the QoE component 112) to be struggling to understand a segment of streamed content (e.g., according to a defined QoE scale, lookup table, or determined via machine learning as later discussed in greater detail). In this regard, the user's QoE can be determined not to satisfy the QoE threshold, and a portion of the streamed content associated with the failure can be replayed (e.g., by the modification component 114). In various embodiments, an instructor can be notified of the failure (e.g., via the communication component 116), which can enable an instructor to provide additional attention or a review of the corresponding subject matter. If a threshold quantity of failures, or a threshold percentage of learners of a CDN 504 experience a failure or content delivery transmission problem over the CDN 504, a widespread failure can be determined to exist (e.g., by the QoS component 110), thus automatically enabling a review session (e.g., via the modification component 114) for an entire classroom (e.g., all participants) receiving streamed content via the CDN (e.g., CDN 504). In further embodiments, failures herein can be logged (e.g., via the communication component 116) for further analysis or pattern recognition (e.g., via machine learning).

In one or more embodiments, modifying the streamed content herein (e.g., via the modification component 114) can comprise modifying (e.g., via the modification component 114) delivery of the streamed content. In this regard, modifying the delivery of the streamed content can comprise changing from a first delivery scheme to a second delivery scheme, different from the first delivery scheme. According to an example, delivery schemes herein can comprise utilization of one or more of a technology types (e.g., display equipment type or peripheral component type). In various implementations, a first delivery scheme can comprise an extended reality transmission (e.g., using a peripheral component 118 comprising extended reality equipment) of the streamed content (e.g., transmitted via the communication component 116 over a CDN 504). In further implementations, streamed content herein can comprise first streamed (e.g., via a communication component 116) content displayed via first display equipment (e.g., extended reality equipment). In this regard, modifying the delivery of the streamed content (e.g., via the modification component 114) can comprise displaying second streamed content, associated with the first streamed content, via second display equipment (e.g., a peripheral component or equipment other than extended reality equipment, such as via a smart device or laptop peripheral component 118).

In various embodiments, feedback (e.g., user feedback) herein can be associated with user comprehension (e.g., as determined by the QoE component 112). In this regard, a user learning in a non-native language can be determined (e.g., by the QoE component 112) to be experiencing a low QoE can be presented a modification to the streamed content in in the form of a translation of the streamed content (e.g., via the modification component 114). In another example, the QoE component 112 can determine one or more users that possess a handicap (e.g., vision difficulty, hearing difficulty, unable to use a keyboard, etc.), which can be determined (e.g., by the QoE component 112) to be indicative of a need to modify (e.g., by the modification component 114) content delivery of the streamed content for that user or for those users. In this regard, the modification component 114 can modify content delivery of the streamed content for users that possess a handicap.

In another embodiment, the modification component 114 can modify the streamed content based on privacy requirements or preferences (e.g., defined privacy requirements or preferences associated with a user profile herein). For example, a minor-user can, based on the minor-user's user profile, be prevented (e.g., by the modification component 114) from receiving or transmitting a video feed of the minor-user over the CDN 504 to adult-users (e.g., and respective peripheral components 118) in the same virtual classroom. In this regard, a user profile herein can comprise age information of a corresponding user, and the modification component 114 can modify the streamed content based on the age information.

According to an embodiment, modifying the streamed content can comprise automatically moving (e.g., by the modification component 114) one or more users to a breakout room (e.g., a virtual breakout room on the CDN) so that an instructor (e.g., of the streamed content) can assist one or more users in the breakout room. In further embodiments, the modification component 114 can suggest a move of a user to a breakout room, rather than automatically moving the user to the breakout room (e.g., breakout room 516). In this regard, modifying the streamed content (e.g., by the modification component 114) can comprise, based on the quality of service or the quality of experience, generating (e.g., via the modification component 114) a breakout room (e.g., breakout room 516) and moving (e.g., by the modification component 114) a group of users (e.g., user profiles) to the breakout room. Further in this regard, the group of user profiles can be determined (e.g., via the QoS component 110 or QoE component 112) to comprise threshold similar quality of service of quality of experience.

It is noted that virtual classrooms herein can comprise live classrooms and/or can comprise asynchronous (e.g., prerecorded) content for participants. In this regard, streamed content herein can be modified, per user, based on one or more factors. For example, a user determined to have prior understanding of a portion of streamed content (e.g., by the QoE component 112 based on defined satisfaction of a defined QoE threshold) can be permitted to skip that portion or be moved to a virtual breakout room (e.g., via the modification component 114). Likewise, a user determined (e.g., by the QoE component 112) to be struggling with a portion of the streamed content can be presented (e.g., by the modification component 114) with additional, relevant, subject matter associated with the portion of the streamed content that the user is struggling with.

Figure 2:
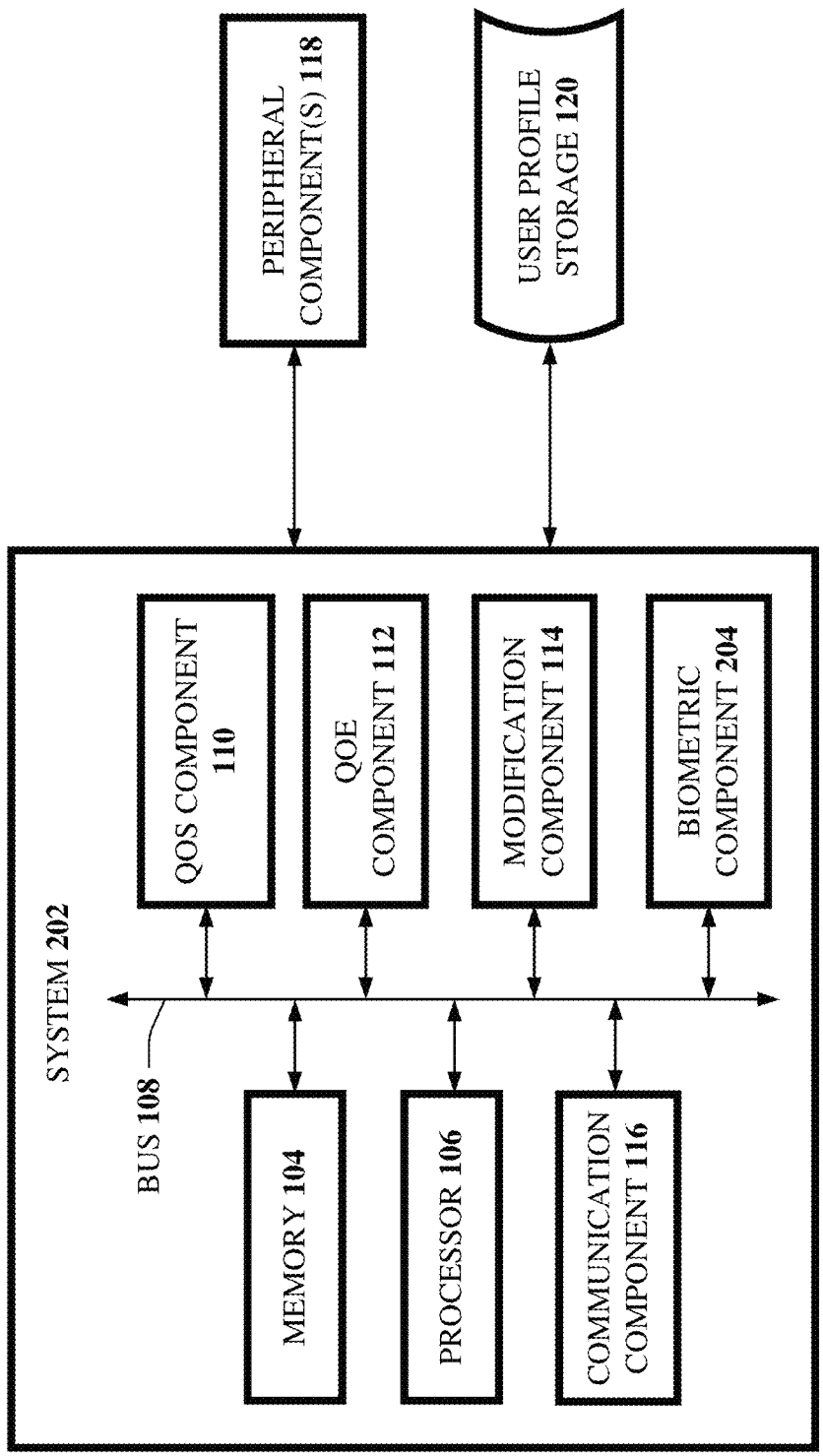
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to personalized content delivery (e.g., for remote learning). The system 202 can be similar to system 102, and can comprise one or more of a variety of components, such as memory 104, processor 106, bus 108, QoS component 110, QoE component 112, modification component 114, and/or communication component 116. In various embodiments, the system 202 can be communicatively coupled to, or can further comprise, peripheral component(s) 118 and/or user profile storage 120. The system 202 can further comprise a biometric component 204. In various embodiments, one or more of the memory 104, processor 106, bus 108, QoS component 110, QoE component 112, modification component 114, communication component 116, peripheral component(s), 118, user profile storage 120, and/or biometric component 204 can be communicatively or operably coupled (e.g., over a bus or wireless network) to one another to perform one or more functions of the system 202.

According to an embodiment, a quality of service metric herein can be based on, for instance, a biometric indicator of the consumer of the streamed content. In this regard, the biometric component 204 can determine the biometric indictor of the consumer of the streamed content (e.g., of a user of a peripheral component 118 herein) via a respective peripheral component 118. In an exemplary embodiment, the biometric indicator can comprise an eye squint of the consumer (e.g., user) determined via a camera of the system 202 or of a peripheral component 118. In additional embodiments, the biometric indicator can comprise an audible sound of the consumer (e.g., user of a peripheral component 118), such as snoring, a side conversation, or another sound, determined or captured via a microphone of the system 202 or of a peripheral component 118 (e.g., determined via the biometric component 204), indicative of a lack of attention of the consumer. In further embodiments, the biometric indicator can comprise a vital health metric determined via a wearable device (e.g., a peripheral component 118), worn by the consumer or user of the streamed content (e.g., a participant of the CDN 504). In this regard, by monitoring the biometric indicator(s) (e.g., by the biometric component 204), the QoS component 110 and/or biometric component 204 can determine a QoS of a given user. For example, a user determined (e.g., via the biometric component 204) to be squinting or a not paying attention can, in some embodiments, be representative of a content delivery problem with the streamed content over the CDN 504 (e.g., packet loss, low throughput, low bandwidth, poor latency, etc.). In further embodiments, the QoE component 112 can determine a QoE based on the biometric indicator. For example, a user determined (e.g., via the QoE component 112) to be losing attention can be determined not to be engaged with the streamed content and thus experiencing a low QoE. In various embodiments herein, a corrective measure determined (e.g., by the modification component 114) to remedy low QoS or low QoE associated with the biometric indicator can be executed (e.g., by the modification component 114).

Figure 3:
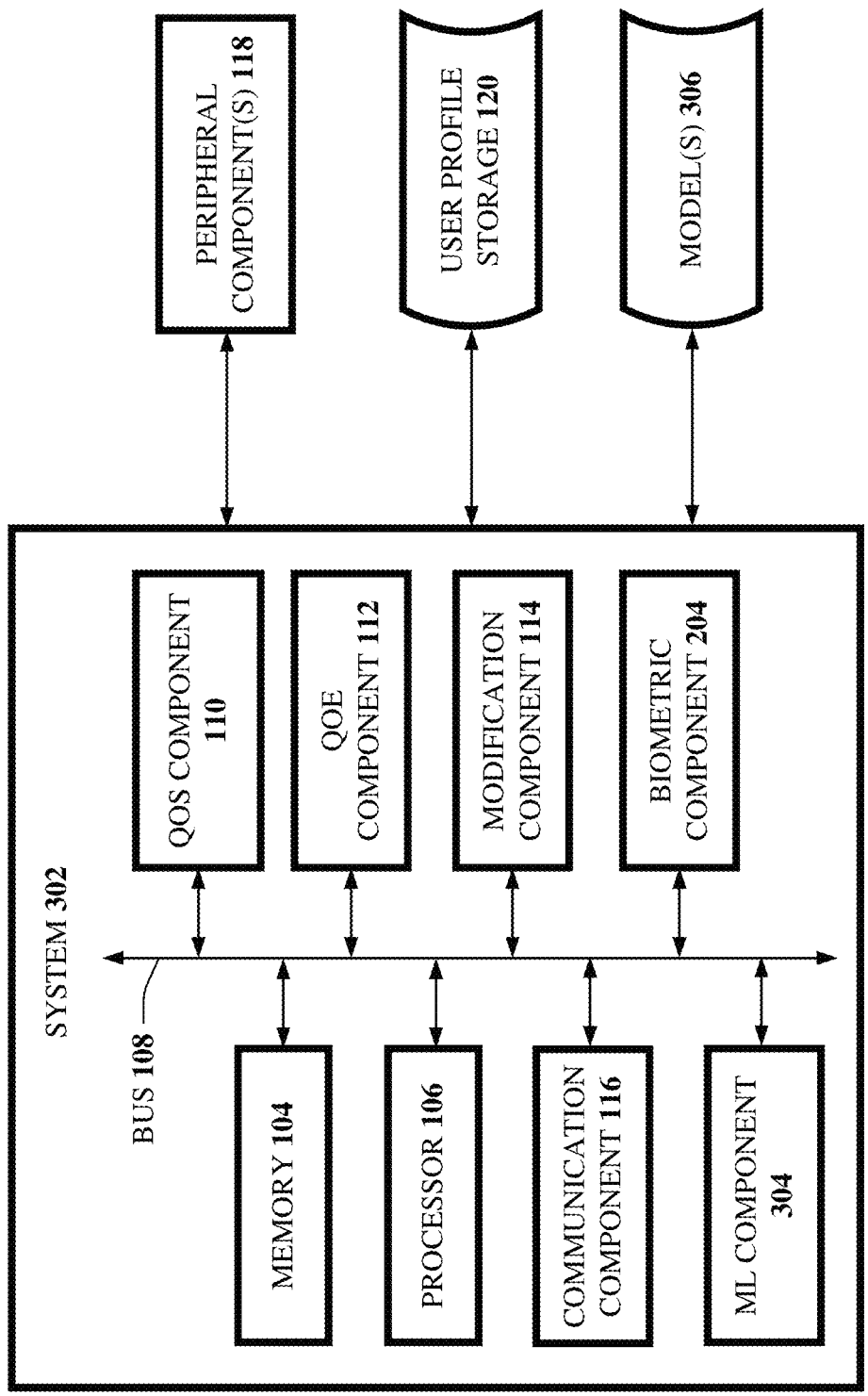
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to personalized content delivery (e.g., for remote learning). The system 302 can be similar to system 202, and can comprise one or more of a variety of components, such as memory 104, processor 106, bus 108, QoS component 110, QoE component 112, modification component 114, communication component 116, and/or biometric component 204. In various embodiments, the system 302 can be communicatively coupled to, or can further comprise, peripheral component(s) 118, and/or user profile storage 120. The system 302 can further comprise a machine learning (ML) component 304. Additionally, or alternatively, the system 302 can be communicatively coupled to, or can further comprise, model(s) 306. In various embodiments, one or more of the memory 104, processor 106, bus 108, QoS component 110, QoE component 112, modification component 114, communication component 116, peripheral component(s) 118, user profile storage 120, biometric component 204, ML component 304, and/or model(s) 306 can be communicatively or operably coupled (e.g., over a bus or wireless network) to one another to perform one or more functions of the system 302.

In one or more embodiments, the QoE and QoS observations (e.g., as utilized by the ML component 304) can be derived from past streamed content from one user (e.g., across different alternate streamed content) or from multiple users (e.g., across the same streamed content) to learn the distinctions and benefits of both intra- and inter-class agreement between the QoS and QoE metrics. These learnings (and the model derived by the ML component 304) can be utilized as a model to further estimate effectiveness of replaying or modifying one or more streamed content sections during system execution. Additionally, or alternatively, these estimates can be utilized to derive similarity (or difference) scores between multiple users (e.g., learners) that may be subsequently included in breakout rooms together. In various implementations, all of these learnings (and the derived models) can be used in part or in whole to better determine a user's profile and his or her affinity for replay and/or modification of streamed content herein.

According to an embodiment, one or more user profiles herein can be generated (e.g., via the ML component 304) using a user profile model (e.g., of the model(s) 306). In this regard, in one or more embodiments, the user profile model can be generated (e.g., by the ML component 304) using machine learning applied to past streamed content other than the streamed content. One or more elements of the user profile (e.g., as determined by the ML component 304 via the user profile model) can comprise, age, learning abilities or disabilities, available peripheral device(s), QoS information, past QoS information, QoE information, past QoE information, user preferences, content delivery preferences, breakout room preferences, or other suitable information. In another embodiment, quality of service herein can be determined (e.g., via the ML component 304) using a quality of service model. In this regard, the quality of service model can be generated (e.g., by the ML component 304) using machine learning applied to past qualities of service of past streamed content other than the streamed content. In one or more embodiments, QoS metrics herein can be weighted, for instance, to accommodate for limited network resources (e.g., of a CDN 504). In further embodiments, quality of experience can be determined (e.g., by the ML component 304) using a quality of experience model. In this regard, the quality of experience model can be generated (e.g., by the ML component 304) using machine learning applied to past qualities of experience of past streamed content other than the streamed content. In various embodiments, QoS can be an input to the QoE model, and can thus be utilized (e.g., by the ML component 304) predict QoE based on QoS. In one or more embodiments the QoE model can comprise a model of a user's predicted perception of streamed content. In various embodiments, QoE metrics herein can be weighted, for instance, based on one or more defined weighting criterion or as determined by the ML component 304.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, ML component 304 can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the ML component 304. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, an ML component 304 herein can initiate an operation associated with determining various thresholds herein (e.g., a motion pattern thresholds, input pattern thresholds, similarity thresholds, authentication signal thresholds, audio frequency thresholds, or other suitable thresholds).

In an embodiment, the ML component 304 can perform a utility-based analysis that factors cost of initiating the above-described operations versus benefit. In this embodiment, the ML component 304 can use one or more additional context conditions to determine various thresholds herein.

To facilitate the above-described functions, a ML component 304 herein can perform classifications, correlations, inferences, and/or expressions associated with principles of artificial intelligence. For instance, the ML component 304 can employ an automatic classification system and/or an automatic classification. In one example, the ML component 304 can employ a probabilistic and/or statistical-based analysis (e.g., factoring into the analysis utilities and costs) to learn and/or generate inferences. The ML component 304 can employ any suitable machine-learning based techniques, statistical-based techniques and/or probabilistic-based techniques. For example, the ML component 304 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 304 can perform a set of machine-learning computations. For instance, the ML component 304 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 4:
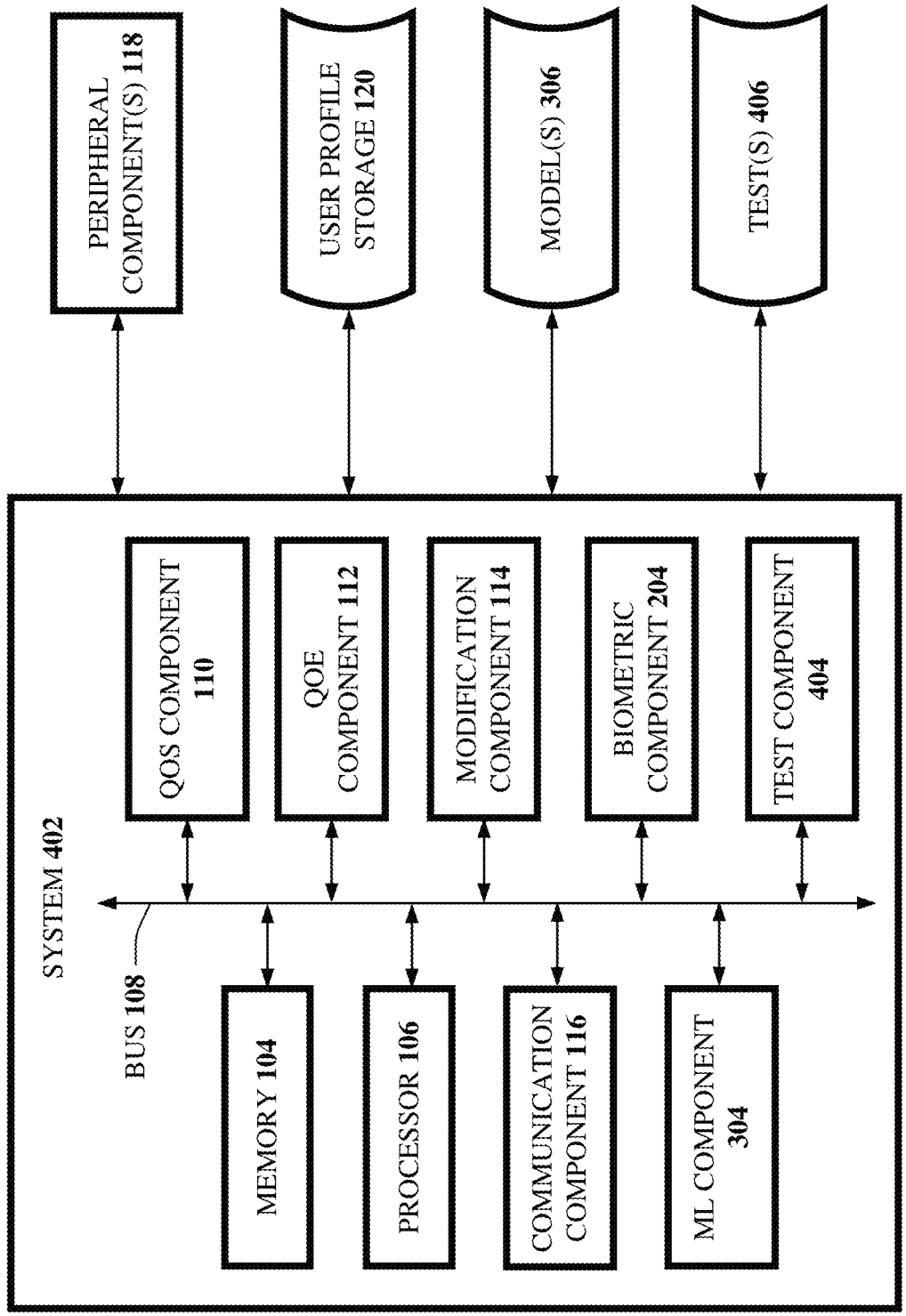
FIG. 4 is a block diagram of an exemplary system in accordance with one or more embodiments described herein.

Turning now to FIG. 4, there is illustrated an example, non-limiting system 302 in accordance with one or more embodiments herein. System 402 can comprise a computerized tool, which can be configured to perform various operations relating to personalized content delivery (e.g., for remote learning). The system 402 can be similar to system 302, and can comprise one or more of a variety of components, such as memory 104, processor 106, bus 108, QoS component 110, QoE component 112, modification component 114, communication component 116, biometric component 204, and/or ML component 304. In various embodiments, the system 402 can be communicatively coupled to, or can further comprise, peripheral component(s) 118, user profile(s) 120, and/or model(s) 306. The system 402 can further comprise a test component 404. Additionally, or alternatively, the system can 402 be communicatively coupled to, or can further comprise, test(s) 406. In various embodiments, one or more of the memory 104, processor 106, bus 108, QoS component 110, QoE component 112, modification component 114, communication component 116, peripheral component(s) 118, user profile(s) 120, biometric component 204, ML component 304, model(s) 306, test component 404, and/or test(s) 406 can be communicatively or operably coupled (e.g., over a bus or wireless network) to one another to perform one or more functions of the system 402.

According to an embodiment, the test component 404 can, based on the quality of service (e.g., determined by the QoS component 110) and the quality of experience (e.g., determined by the QoE component 112), generate a test to be presented via a user interface of a peripheral component 118 or of a system herein. In this regard, modifying the streamed content herein (e.g., via the modification component 114) can be further based on a result of the test. In one or more embodiments, a test herein (e.g., of the tests 406) can comprise an eye test. In this regard, the test component 404 can determine visual abilities or limitations of a user. For example, a user can be determined experiencing a low QoE (e.g., as determined by the QoE component 112). To determine whether a root cause of the low QoE is based on a visual limitation, the test component 404 can present a defined visual test (e.g., in the form of a game presented via a peripheral component 118). In this regard, tests 406 herein can comprise games (e.g., presented via peripheral components herein) intended to evaluate visual, audible, tactile, spatial reasoning, or other abilities. Further, tests herein can be presented by the test component 404 in order to help maintain a threshold QoE (e.g., in response to the QoE component 112 determining that a user is becoming distracted). In this regard, in response to the QoE component 112 determining that a user comprises a QoE below a QoE threshold, the test component 404 can present a test associated with the low QoE. For example, the QoE component 112 can determine that a user is struggling with a learning concept of the streamed content. In this example, the test component 404 can therefore present a test (e.g., of the tests 406) to determine whether the user understands vocabulary associated with the learning concept of the streamed content. In an embodiment, if a result of a test 406 facilitated via test component 404 is indicative (e.g., as determined by the QoS component 110 or QoE component 112) of a QoS or QoE problem, the modification component 114 can be configured to modify the streamed content (e.g., over the CDN 504) to remedy the QoS or QoE problem for one or more participants of a virtual classroom (e.g., via the CDN 504).

Figure 5:
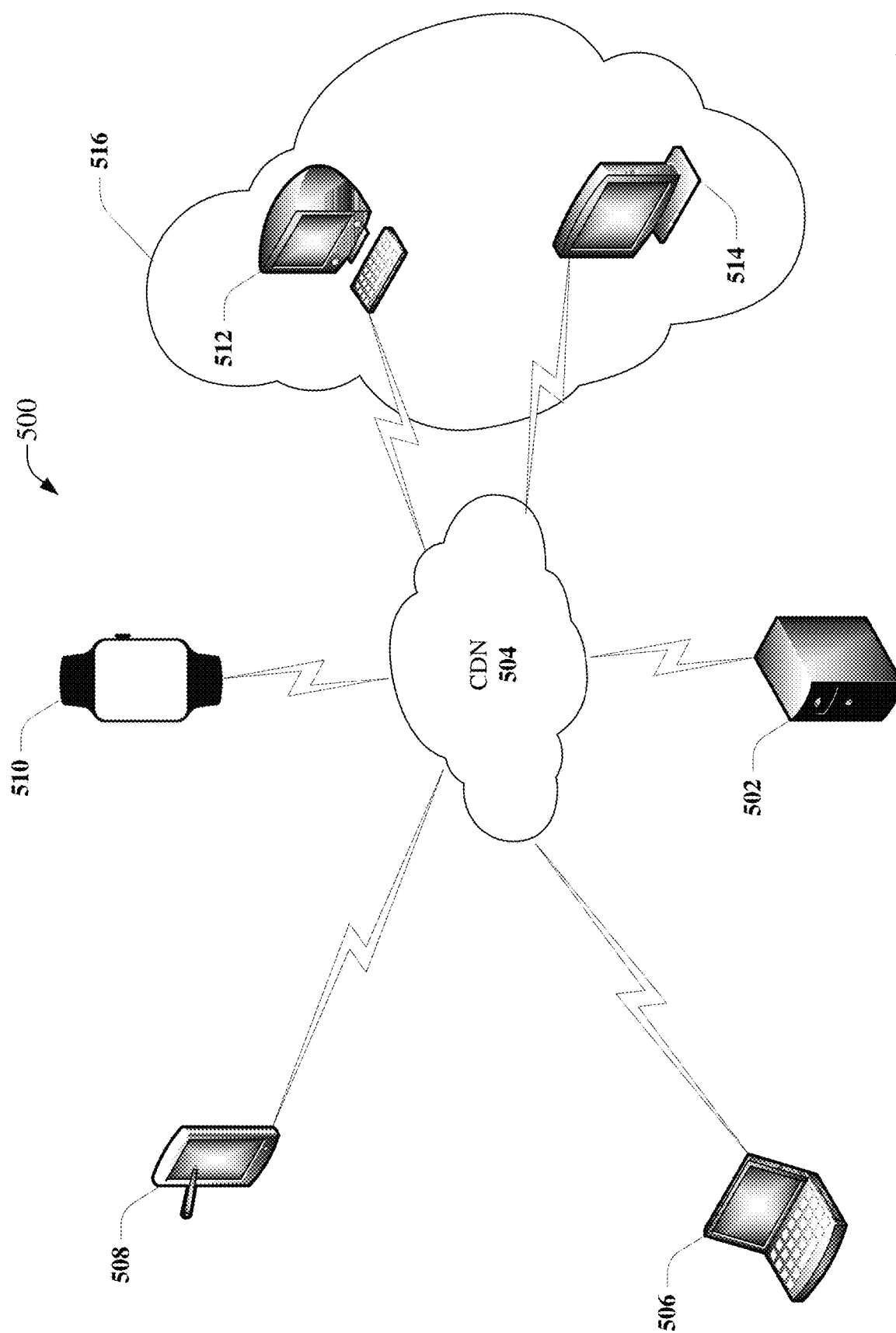
FIG. 5 is a block diagram of an exemplary system topology in accordance with one or more embodiments described herein.

FIG. 5 illustrates a block diagram of an exemplary system topology 500 in accordance with one or more embodiments described herein. In various embodiments, system topology 500 can be associated with a virtual classroom, a virtual meeting room, or another virtual space, and can comprise one or more of a system 502, CDN 504, peripheral component 506, peripheral component 508, peripheral component 510, peripheral component 512, peripheral component 514, and/or breakout room 516. In various embodiments, one or more of the system 502, CDN 504, peripheral component 506, peripheral component 508, peripheral component 510, peripheral component 512, peripheral component 514, and/or breakout room 516 can be communicatively or operably coupled (e.g., over a bus or wireless network) to one another.

According to an embodiment, the system 502 can be similar to system 102, system 202, system 302, or system 402, and can thus comprise similar components. The CDN 504 can comprise a CDN over which streamed content herein can be transmitted (e.g., between a peripheral component 506 and a peripheral component 508). In an example, the peripheral component 506 can comprise a laptop and/or can comprise an instructor or teacher device (e.g., associated with a user profile comprising an instructor user profile or a teacher user profile). Peripheral component 508 can comprise a student device such as a smartphone (e.g., associated with a user profile comprising a student user profile). Peripheral component 510 can comprise a smartwatch, peripheral component 512 can comprise a desktop computer, and peripheral component 514 can comprise a smart television. It is noted that such peripheral components are exemplary, and that other peripheral components are envisaged and can be utilized with a CDN 504 herein. In one or more embodiments, the system 502 can facilitate broadcast of a virtual classroom, a virtual meeting room, or another virtual space for communication over the CDN 504. One or more peripheral devices can be registered with the system 502 and/or CDN 504 to participate in the virtual classroom, a virtual meeting room, or another virtual space (e.g., based on respective user profiles).

According to an embodiment, the breakout room 516 can comprise a smaller section of an overall virtual classroom, virtual meeting room, or another suitable virtual space that can be utilized for more personalized instruction (e.g., live, or asynchronous). In various implementations, peripheral components herein can be moved (e.g., by the system 502) into or out of one or more breakout rooms (e.g., breakout room 516) associated with the CDN 504. In this regard, content delivery to peripheral components in the breakout room 516 can differ from content to delivery to peripheral components not in the breakout room 516. For example, the breakout room 516 can be utilized to offer review for learners that are behind their peers, for learners that are excelling and would benefit from more advanced material, or can be otherwise utilized. In this regard, prerecorded or live content can be conveyed to peripheral components 118 assigned to the breakout room 516. In another implementation, the system 502 can group learners with similar progress into the breakout room 516 (e.g., to encourage collaborative recovery or advanced learning). For example, if a set of learners is repeatedly experiencing replayed content or challenges (e.g., as detected by the QoS component 110, QoE component 112, modification component 114, communication component 116, or another suitable component or system herein) at the same moment in the streamed content, the system 502 can group the set of learners into a single breakout room (e.g., breakout room 516). Additionally, or alternatively, if a group of learners is detected (e.g., by the system 502) to be more advanced than the current content, a similar breakout room can be created (or suggested). In both scenarios, the system 502 can then utilize the modification component 114 in tandem with the ML component 304 to optimally replay or skip to the portions of most beneficial content (e.g., of the streamed content).

Figure 6:
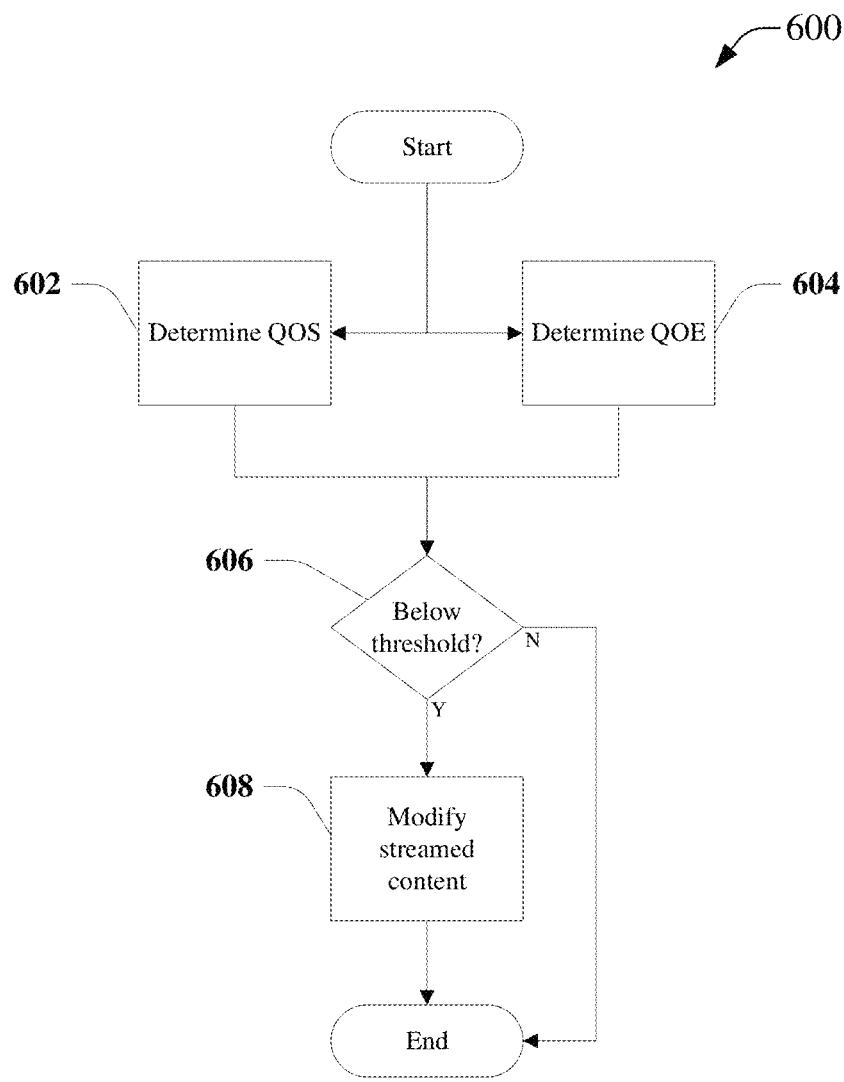
FIG. 6 is a flowchart for a process associated with personalized content delivery in accordance with one or more embodiments described herein.

Turning now to FIG. 6, there is illustrated a flowchart of a process 600 relating to personalized content delivery (e.g., for remote learning) in accordance with one or more embodiments described herein. At 602, a QoS metric (e.g., a defined QoS metric) representative of a QoS of streamed content delivered via a CDN can be determined (e.g., by a QoS component 110). In various embodiments, the quality of service metric can comprise, or be based on, one or more of a throughput via the content delivery network (e.g., CDN 504), bandwidth of the content delivery network (e.g., CDN 504), a latency of the content delivery network, packet loss associated with streamed content (e.g., over a network, such as the content delivery network), or can be based on another suitable factor. In this regard, the QoS metric (e.g., a defined QoS metric) can be utilized to quantify QoS for streamed content delivered via a content delivery network (e.g., CDN 504). At 604, a QoE metric representative of a QoE associated with a user profile of a consumer (e.g., associated with a peripheral component) of the streamed content can be determined (e.g., by the QoE component 112). In various embodiments, the QoE can be representative of a user's (e.g., user profile's) experience with the streamed content. For example, a low QoE can be representative of a user struggling to understand the streamed content and corresponding subject matter. In another example, a high QoE can be representative of a user mastering understanding of the streamed content. In an embodiment, the QoE component 112 can interpret cues (e.g., captured via peripheral component(s) 118) of a user as to whether the user is absorbing the information, for instance, by tracking facial expressions or providing an interface (e.g., via the communication component 116) that derives feedback for instructor or teacher of the streamed content. In this regard, user feedback herein can comprise one or more of a variety of forms (e.g., direct facial recognition, facial expression recognition, user interface to allow feedback about whether to understanding material or not). At 606, if the QoS is determined (e.g., by the QoS component 110) to be below a QoS threshold or the QoE is determined (e.g., by the QoE component 112) to be below a QoE threshold, the process can proceed to 608. At 608, the streamed content can be modified (e.g., by the modification component 114). It is noted that in one or more embodiments, modifying the streaming content (e.g., via the modification component 114) can occur in response to receiving (e.g., by the communication component 116 via a content delivery network), a request to modify the streamed content. In this regard, streamed content can be modified (e.g., via the modification component 114) based on the request. In further embodiments, modifying (e.g., by the modification component 114) the streamed content can comprise replaying a portion of the streamed content, zooming on a portion of the streamed content, cropping a video of the streamed content, reducing complexity of an avatar of the streamed content, reducing to audio only or video only, modifying a playback speed of the streamed content, or other suitable modifications.

Figure 7:
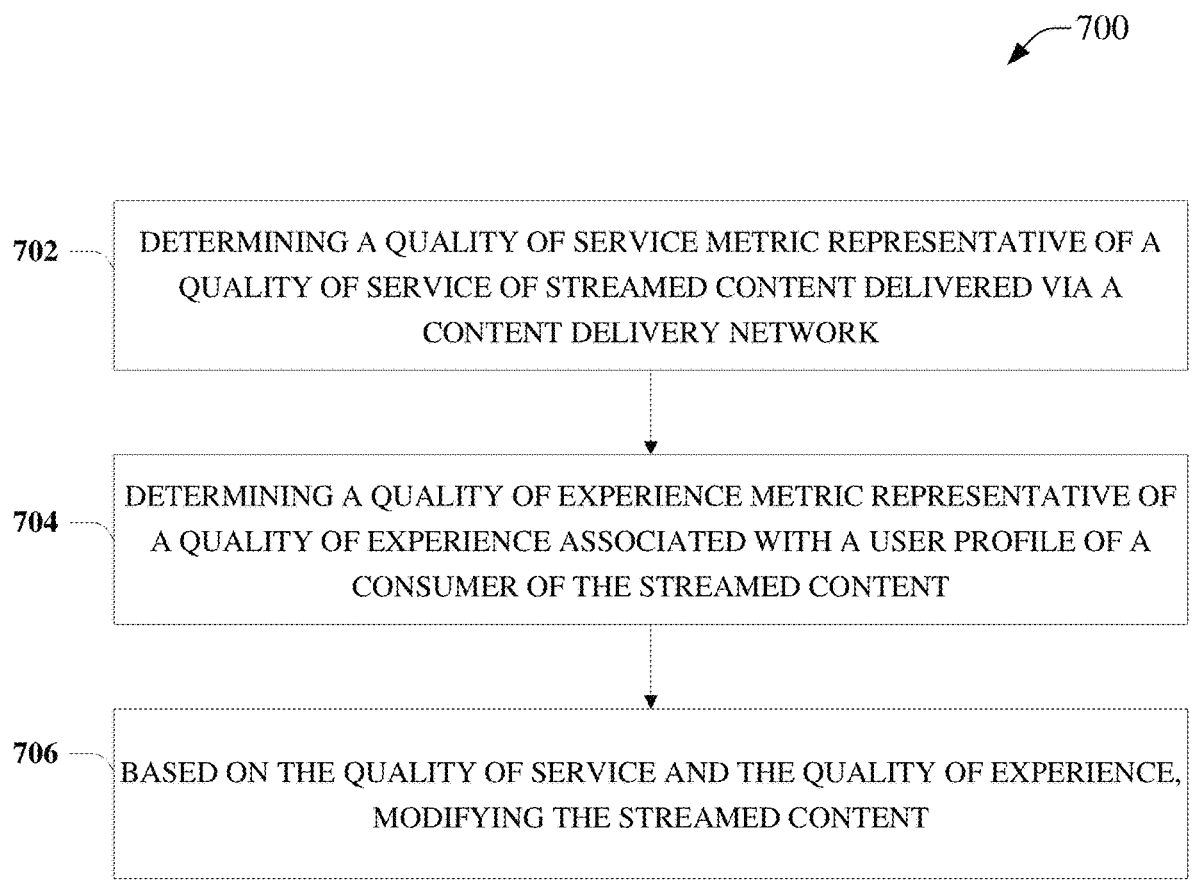
FIG. 7 is a block flow diagram for a process associated with personalized content delivery in accordance with one or more embodiments described herein.

FIG. 7 illustrates a block flow diagram for a process 700 associated with personalized content delivery (e.g., for remote learning) in accordance with one or more embodiments described herein. At 702, the process 700 can comprise determining (e.g., via a QoS component 110) a quality of service metric representative of a quality of service of streamed content delivered via a content delivery network (e.g., CDN 504). At 704, the process 700 can comprise determining (e.g., via a QoE component 112) a quality of experience metric representative of a quality of experience associated with a user profile (e.g., stored in the user profile storage 120) of a consumer of the streamed content. At 706, the process 700 can comprise, based on the quality of service and the quality of experience, modifying (e.g., via the modification component 114) the streamed content.

Figure 8:
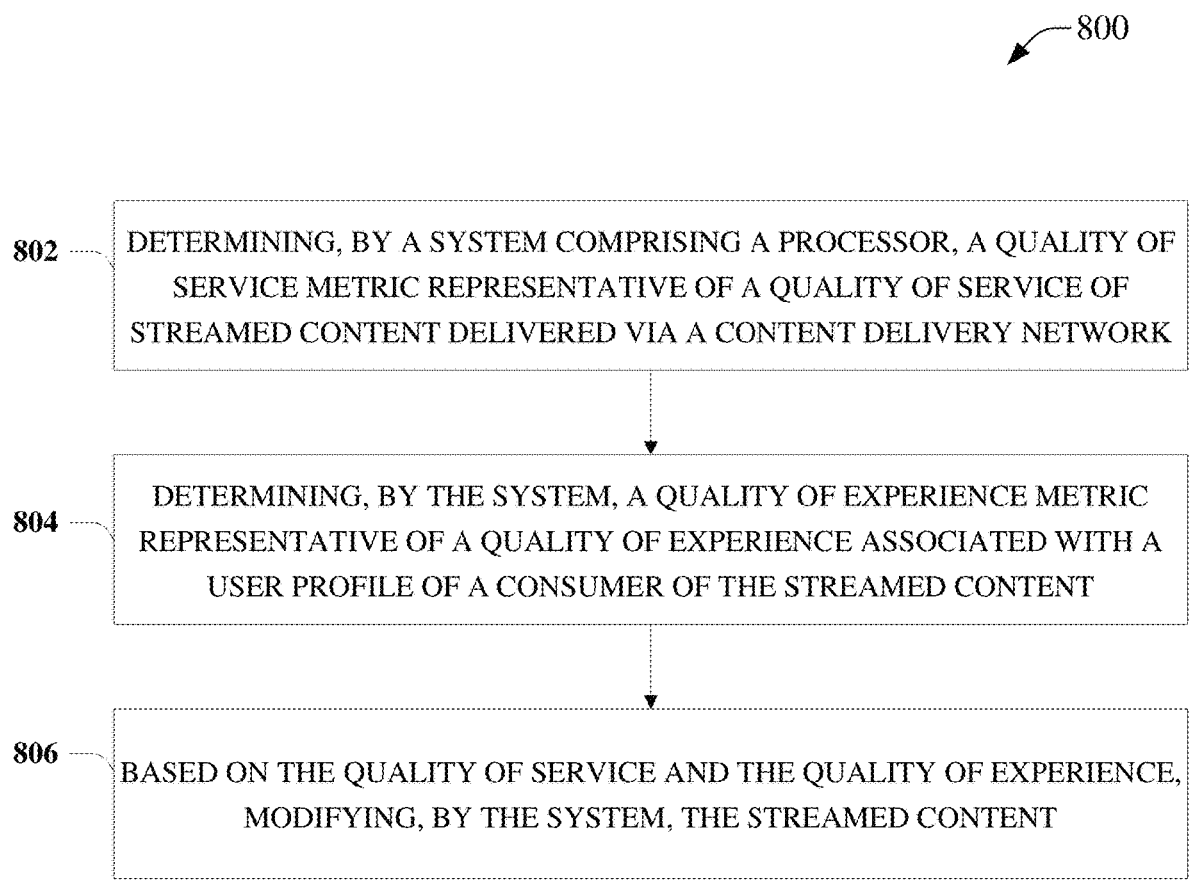
FIG. 8 is a block flow diagram for a process associated with personalized content delivery in accordance with one or more embodiments described herein.

FIG. 8 illustrates a block flow diagram for a process 800 associated with personalized content delivery (e.g., for remote learning) in accordance with one or more embodiments described herein. At 802, the process 800 can comprise determining, by a system comprising a processor (e.g., via a QoS component 110), a quality of service metric representative of a quality of service of streamed content delivered via a content delivery network (e.g., CDN 504). At 804, the process 800 can comprise determining, by the system (e.g., via a QoE component 112), a quality of experience metric representative of a quality of experience associated with a user profile (e.g., stored in the user profile storage 120) of a consumer of the streamed content. At 806, the process 800 can comprise, based on the quality of service and the quality of experience, modifying, by the system (e.g., via the modification component 114), the streamed content.

Figure 9:
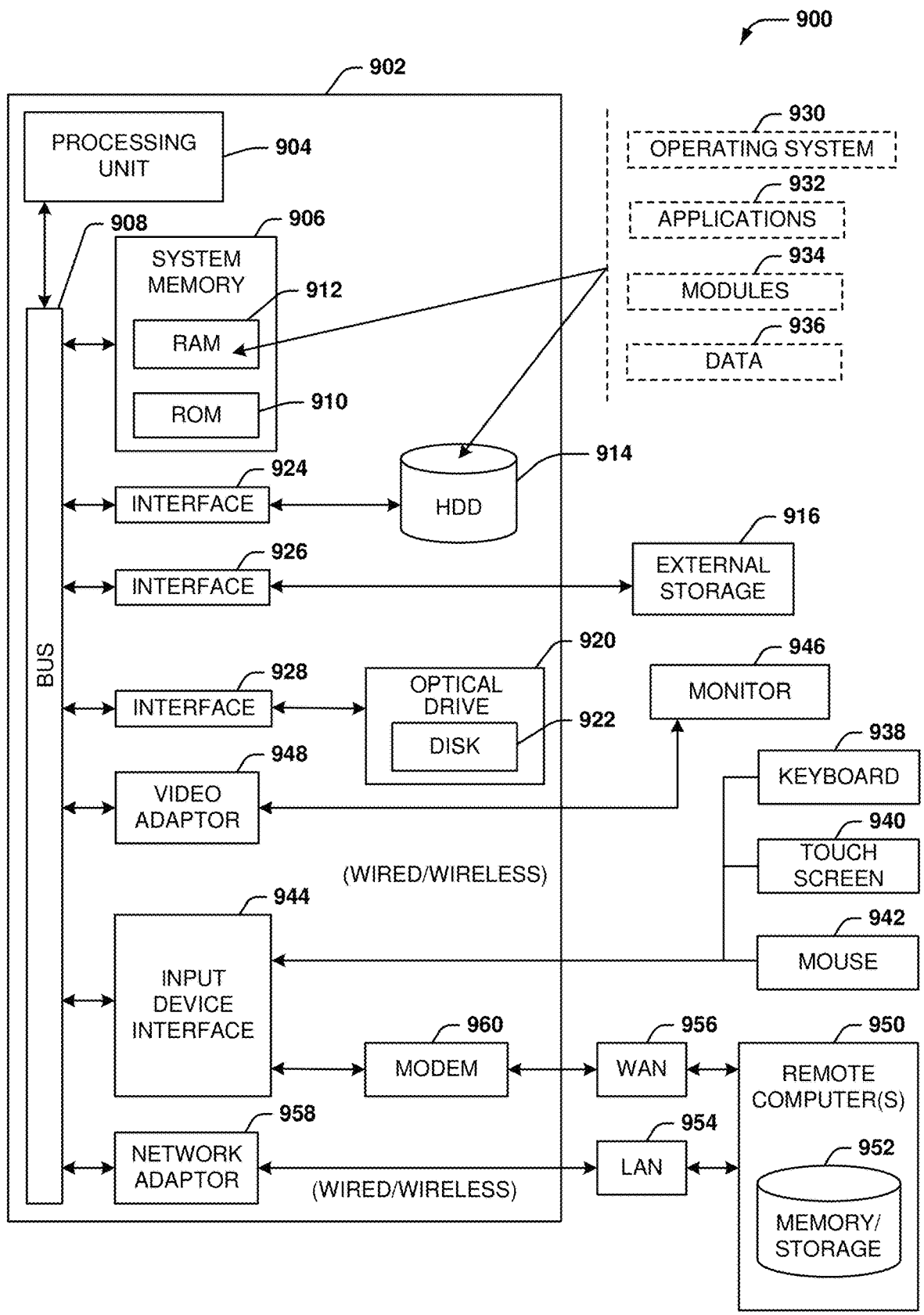
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a nonvolatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
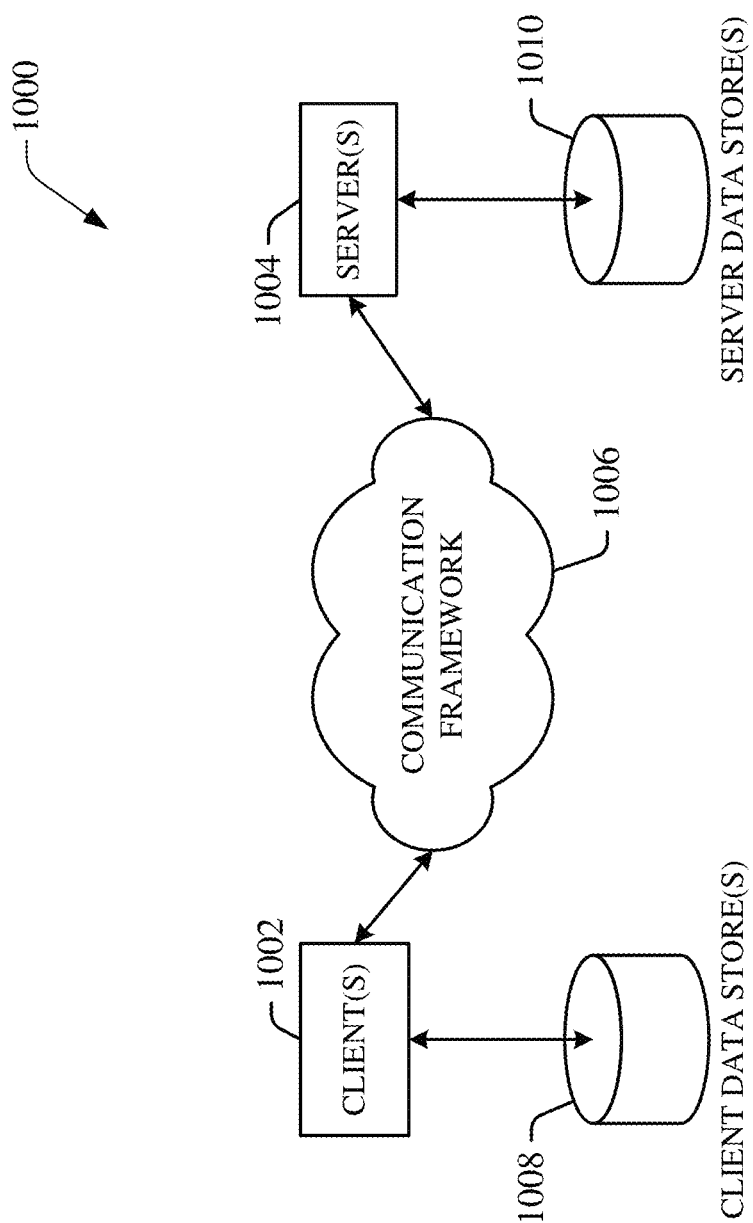
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
determining a quality of service metric representative of a quality of service of streamed content delivered via a content delivery network to enable consumption of the streamed content for a first group of user profiles represented in a first virtual meeting space;
determining a quality of experience metric representative of a quality of experience of the consumption of the streamed content associated with a user profile of the first group of user profiles, wherein the quality of experience is associated with an understanding of the streamed content by a consumer associated with the user profile; and based on the quality of service and the quality of experience being determined to satisfy a defined modification criterion, modifying the streamed content resulting in modified stream content, wherein modifying the streamed content comprises:

based on the quality of service or the quality of experience, generating a second virtual meeting space, different from the first virtual meeting space, wherein respective user profiles of a second group of user profiles represented in the second virtual meeting space are delivered the modified streamed content; and moving a subgroup of the first group of user profiles, comprising the user profile, from being able to consume the streamed content in the first virtual meeting space to being able to consume the modified streamed content in the second virtual meeting space, wherein the subgroup of the first group of user profiles is determined to specify respective qualities of service or respective quality of experiences applicable to consumption of content that are threshold similar to the quality of service or the quality of experience enabled for the modified streamed content in the second virtual meeting space.

2. The system of claim 1, wherein the quality of service metric comprises a throughput of the content delivery network or a latency of the content delivery network.

3. The system of claim 1, wherein the quality of service metric comprises packet loss associated with the streamed content.

4. The system of claim 1, wherein the quality of service metric or the quality of experience metric is based on a biometric indicator of the consumer of the streamed content.

5. The system of claim 4, wherein the biometric indicator comprises an eye squint of the consumer determined via a camera of the system or a sound from the consumer captured via a microphone of the system.

6. The system of claim 4, wherein the biometric indicator comprises a vital health metric determined via a wearable device, of the system, worn by the consumer of the streamed content.

7. A non-transitory machine-readable medium, comprising executable instructions that, when executed by a processor, facilitate performance of operations, comprising:

determining a quality of service metric representative of a quality of service of streamed content delivered via a content delivery network to first user profiles represented in a first virtual meeting space;

determining a quality of experience metric representative of a quality of experience associated with a user profile of a consumer of the streamed content in the first virtual meeting space, wherein the quality of experience is associated with an understanding of the streamed content by the consumer; and based on the quality of service and the quality of experience being determined to satisfy a defined modification criterion, modifying the streamed content, resulting in modified streamed content, wherein the modifying comprises:

based on the quality of service or the quality of experience, generating a second virtual meeting space, different from the first virtual meeting space, wherein second user profiles represented in the second virtual meeting space are delivered the modified streamed content; and moving a subgroup of the first user profiles, comprising the user profile, from the first virtual meeting space to the second virtual meeting space, wherein respective user profiles of the subgroup of the first user profiles are determined to be associated with respective qualities of service or respective quality of experiences that are threshold similar to the quality of service or the quality of experience enabled via the second virtual meeting space.

8. The non-transitory machine-readable medium of claim 7, wherein modifying the streamed content further comprises:

in response to a determination that
the quality of service fails to satisfy a defined quality of service threshold, or
the quality of experience fails to satisfy a defined quality of experience threshold,
replaying a portion of the streamed content determined to be associated with the failure to satisfy the defined quality of service threshold or the failure to satisfy the defined quality of experience threshold.

9. The non-transitory machine-readable medium of claim 7, wherein modifying the streamed content further comprises modifying delivery of the streamed content.

10. The non-transitory machine-readable medium of claim 9, wherein modifying the delivery of the streamed content further comprises changing from a first delivery scheme to a second delivery scheme, different from the first delivery scheme.

11. The non-transitory machine-readable medium of claim 10, wherein the first delivery scheme comprises an extended reality transmission of the streamed content.

12. The non-transitory machine-readable medium of claim 9, wherein the streamed content comprises first streamed content displayed via first display equipment, and wherein modifying the delivery of the streamed content further comprises displaying second streamed content, associated with the first streamed content, via second display equipment.

13. The non-transitory machine-readable medium of claim 7, wherein the quality of service is determined based on a hardware characteristic of user equipment associated with the user profile.

14. The non-transitory machine-readable medium of claim 7, wherein the user profile is generated using a user profile model, and wherein the user profile model has been generated using machine learning applied to past streamed content other than the streamed content.

15. A method, comprising:

determining, by a system comprising a processor, a quality of service metric representative of a quality of service of streamed content delivered via a content delivery network to a first group of user profiles represented in a first virtual meeting space;

determining, by the system, a quality of experience metric representative of a quality of experience associated with a user profile of a consumer of the streamed content, wherein the quality of experience is based on feedback from the consumer indicative of an understanding of the streamed content by the consumer; and based on the quality of service and the quality of experience being determined to satisfy a defined modification criterion, modifying, by the system, the streamed content, wherein modifying the streamed content results in modified streamed content different from the streamed content, and wherein the modifying comprises:
- based on the quality of service or the quality of experience, generating, by the system, a second virtual meeting space, different from the first virtual meeting space, wherein a second group of user profiles represented in the second virtual meeting space are delivered the modified streamed content; and
- moving, by the system, a subgroup of the first group of user profiles, comprising the user profile, from the first virtual meeting space to the second virtual meeting space, wherein respective user profiles of the subgroup of the first group of user profiles are determined to specify respective qualities of service or respective quality of experiences that are threshold similar to the quality of service or the quality of experience for the second virtual meeting space.

16. The method of claim 15, wherein the quality of service is determined, by the system, using a quality of service model, and wherein the quality of service model has been generated, by the system, using machine learning applied to past qualities of service of past streamed content other than the streamed content.

17. The method of claim 15, wherein the quality of experience is determined, by the system, using a quality of experience model, and wherein the quality of experience model has been generated, by the system, using machine learning applied to past qualities of experience of past streamed content other than the streamed content.

18. The method of claim 15, further comprising:
- based on the quality of service and the quality of experience, generating, by the system, a test to be presented via a user interface of the system, wherein modifying the streamed content is further based on a result of the test.

19. The method of claim 15, further comprising:
- receiving, by the system via the content delivery network, a request to modify the streamed content, wherein the streamed content is modified, by the system, based on the request.

20. The method of claim 18, wherein the test comprises a defined visual test configured to determine a visual ability or limitation of the consumer.

\* \* \* \* \*